(12) United States Patent
Dureau et al.

(10) Patent No.: US 9,363,310 B2
(45) Date of Patent: Jun. 7, 2016

(54) STANDARD COMMANDS FOR NATIVE COMMANDS

(71) Applicant: Google Inc., Mountain View, CA (US)

(72) Inventors: Vincent Dureau, Palo Alto, CA (US); Justin Koh, San Francisco, CA (US); Pierre-Yves Laligand, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/591,078

(22) Filed: Jan. 7, 2015

(65) Prior Publication Data

US 2015/0127705 A1    May 7, 2015

Related U.S. Application Data

(63) Continuation of application No. 12/485,589, filed on Jun. 16, 2009, now Pat. No. 8,954,955.

(51) Int. Cl.
*G06F 9/445* (2006.01)
*H04L 29/08* (2006.01)
*G06F 9/44* (2006.01)
*G06F 17/30* (2006.01)

(52) U.S. Cl.
CPC .............. *H04L 67/10* (2013.01); *G06F 9/4443* (2013.01); *G06F 17/30424* (2013.01)

(58) Field of Classification Search
None
See application file for complete search history.

(56) References Cited

U.S. PATENT DOCUMENTS

| | | | |
|---|---|---|---|
| 6,522,343 B2 * | 2/2003 | Sobeski et al. | 715/744 |
| 6,665,731 B1 * | 12/2003 | Kumar et al. | 709/246 |
| 6,675,230 B1 * | 1/2004 | Lewallen | 719/328 |
| 6,901,425 B1 * | 5/2005 | Dykes et al. | 709/203 |

* cited by examiner

*Primary Examiner* — Elias Mamo
(74) *Attorney, Agent, or Firm* — Bryne Poh LLP

(57) ABSTRACT

A system and method for standardizing commands used for various application behaviors in an application regardless of the environment of the application. A client intercepts a user input standard command, retrieves a corresponding native command from a standardizing server and inputs the native command in the application.

21 Claims, 7 Drawing Sheets

Add-on Function Information

| | | |
|---|---|---|
| Website Identifier | | 711 |
| Application Identifier | | 712 |
| Add-on function identifier | | 713 |
| Add-on function description | | 714 |
| Add-on function download location | | 715 |
| Plugin identifier | | 716 |
| Plugin description | | 717 |
| Plugin download location | | 718 |

Submit Entered Data — 720

Fig. 7

STANDARD COMMANDS FOR NATIVE COMMANDS

CROSS-REFERENCE TO RELATED APPLICATION

This application is a continuation of U.S. patent application Ser. No. 12/485,589, filed Jun. 16, 2009, which is hereby incorporated by reference herein in its entirety.

BACKGROUND

1. Field of Invention

The present invention generally relates to user interface for web-based applications, and in particular, is directed towards standardizing command interfaces for web applications on various websites.

2. Description of the Related Art

The proliferation of web-based applications gives users access to a broad range of familiar classes of web-based applications across various websites. For example, many different websites provide classes of applications such as video hosting applications, document editors, email systems, and the like. The familiarity with a class of web-based application, however, is often not transferrable from one website to another because of the varying user interface for different instances of the same class of web-based applications. For example, a video player application on a first website may use CTRL-P as a native command for the PLAY command, whereas another instance of a video player application on a second website may use ALT-P as a native command for the PLAY command. Even though the user is familiar with the video player application on the first website, the user cannot leverage her knowledge to operate the video player application on the second website.

Many web-based applications also provide the ability for third party developers to develop add-on functionality for an existing web-based application via scripts, plugins, or other application programming extensions. However, third party developers have a difficult time making users aware of such add-on functionality due to limited distribution channels and difficulties in installing such features. Generally, to obtain add-on functionality for an application, users have to know that such functionality is available, for example by searching the Internet for scripts for a given application, then determine which ones are of interest, and finally understand how to install such features. Many users are not sophisticated enough to perform these tasks and thus do not benefit from the add-on functionality offered by third party developers.

SUMMARY

The present invention enables the use of standardized commands for various types of web-based applications. Different instances of a given type of web-based application, such as a video player, can all use a single standardized set of commands for controlling the player, even though the different instances on different websites that use different and potentially conflicting native commands. Another aspect of the present invention also provides a user with information identifying, and access to, add-on functionality available for a web-based application.

In one embodiment, user-input standardized command for a web application is intercepted within the browser used to access the web application. The browser queries a standardizing server, which stores a database of native commands and their corresponding standardized commands for a plurality of different websites and web applications. The standardizing server determines the native command for the web application that corresponds to the standardized command, and returns the native command to the browser. The browser forwards the native command to the website hosting the web-based application. The website inputs the native command into the web application to affect the desired functionality. The browser can also determine other native commands for various application behaviors and display the other native commands with corresponding standard commands to the user.

In one embodiment, the browser intercepts a request to access a website, and obtains from a standardizing server a list of add-on functionality supported by the website and any plugins required for the add-on functionality, and displays information about the add-on functionality and corresponding plugins to the user.

BRIEF DESCRIPTION OF THE DRAWINGS

FIG. 7 is an illustration of a user interface for populating a database comprising information about the add-on functions and corresponding plugins.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
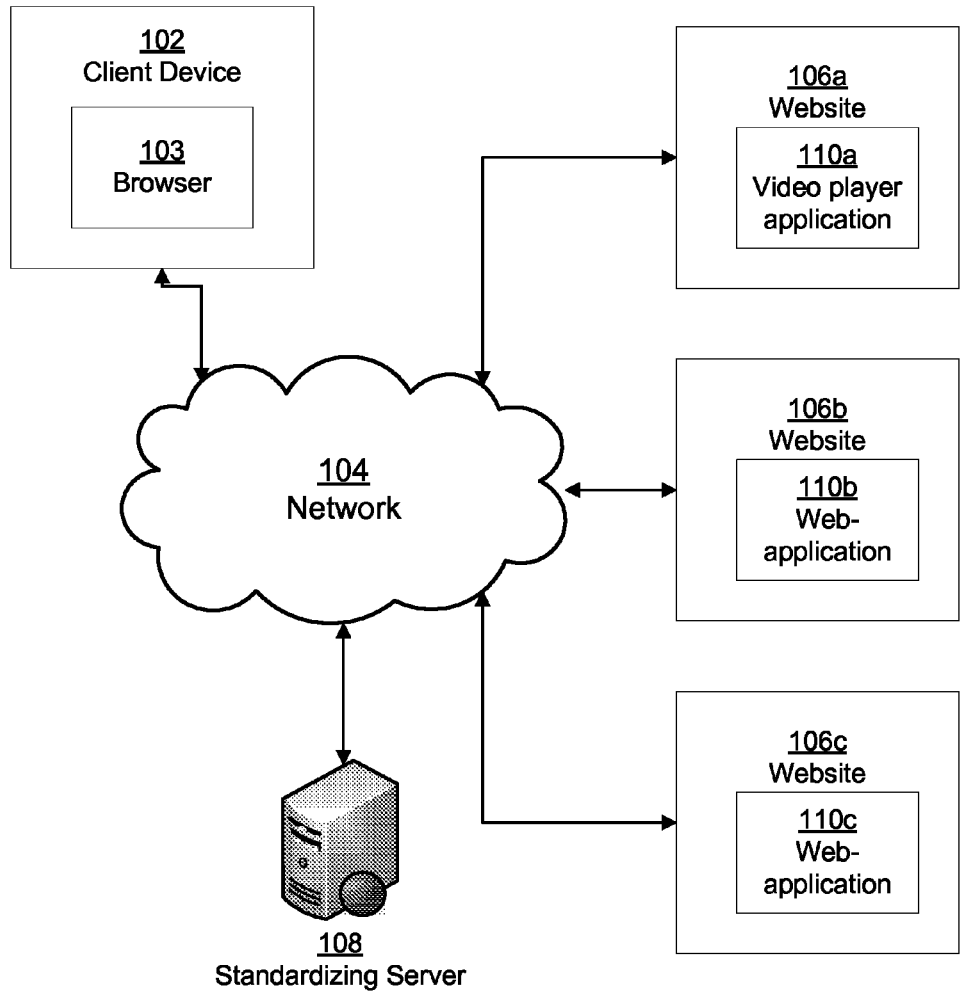
FIG. 1 is an illustration of an exemplary environment for implementation of an embodiment of the present invention.

FIG. 1 is an illustration of an exemplary environment for implementation of an embodiment of the present invention, comprising client devices 102, a standardizing server 108, and multiple websites 106, all of which communicate via the Internet 104.

Each client device 102 executes a client application adapted to communicate over the Internet 104. Generally, this application is a browser 103, but other applications as well can include the appropriate communications facilities. The browser 103 is configured to communicate with the standardizing server 108 in the manner further described below, and in particular is configured to provide the functionality described herein for interoperating with the standardizing server 108. The client device 102 can use any variety of internetworking technology to connect to the Internet 104, such as a dial-up connection through a modem, a wired or wireless telephone link; a broadband connection, for example through a T-1 line, cable modem, ADSL line and modem; a wireless network connection, for example through an 802.xx protocol, or the like. While only a single client device 102 is shown, in practice there will many client devices 102 operating concurrently.

Websites 106a-c host web-based applications 110 such as video players, text editor, databases, document management systems, spreadsheet editor, data analysis systems, map and direction applications, development environments, and so forth. The web-based applications 110 include applications that use client side scripting or code to access underlying client side software (e.g. video playback engines such as Adobe Flash®, or graphics renderers such as Adobe Acrobat®) to provide their functionality. Different websites 106 include different instances of a given class of hosted application 110, which have different native command sets. For example, website 106a includes a video player application 110a in which OPT-P is the native command for the PLAY function, whereas a video player at website 106b uses ALT-P as the native command, and website 106c uses CNTL-ALT-K as the native command for this function.

The standardizing server 108 includes a processor coupled to a computer-readable memory and a communications device. The server 108 can be implemented as one or more server class computers. The server class computers include one ore more high-performance CPUs and 1 G or more of main memory, as well as 500 Gb to 2 Tb of storage. An open-source operating system such as LINUX is used. The operations of the standardizing server 108 as described herein can be implemented through either hardware (e.g., dedicated computing devices or daughter-boards in general purpose computers), or through computer programs installed in computer storage on the standardizing server 108 and executed by the processors to perform the functions and organize and store the data described herein.

Generally, a user of a client device 102 accesses a hosted application 110 at a website 106, such as a video player application 110a at website 106a to access stored videos at the website 106a. To play a selected video, the user inputs a standardized command, such as CNTL-P to invoke the play function, where the native command, is OPT-P as mentioned above. The browser 103, configured by a script, plugin, addon or other client side implementation, intercepts the standardized command, and provides a message to the standardizing server 108 that is used to identify the website 106a, the web application 110a, and the input standardized command. The standardizing server 108 determines a native command (here OPT-P) that corresponds to the standardized command for this particular website 106a and web application 110a. The standardizing server 108 returns this native command to the browser 103 of the client device 102. The browser 103 then provides the native command (OPT-P) to the video player application 110a, which thereby affects the desired play function.

Similarly, if the user now accesses website 106b and its video player application 110b, which has a different native command for play (ALT-P), the user can again use the standardized command CNTL-P to invoke the play function. Here, the browser 103 intercepts the standardized command, and provides information identifying the website 106b and application 110b to the standardizing server 108. The server 108 determines the corresponding native command, which is different here than that used for application 110b, and provides that native command (ALT-P) to the browser 103. The browser 103 transmits this native command to the video player application 110b, which affects the play function.

These operations of intercepting the standardizing command, determining the corresponding native command, providing the native command to the browser, and ultimately to the web application 110 are performed transparently to the user and to the web application 110 itself.

Figure 2:
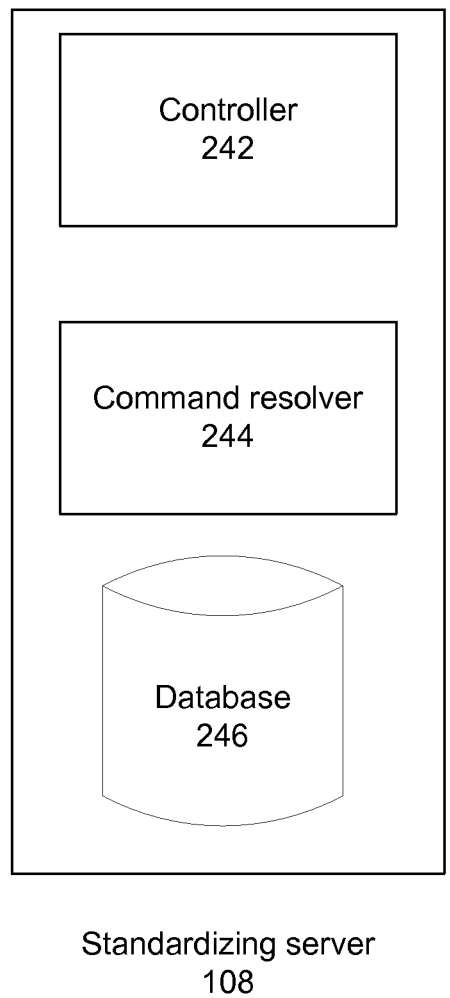
FIG. 2 is a detailed illustration of a standardizing server for providing a web-based application with native commands when the user provides a standard command to the web-based application.

FIG. 2 is a detailed illustration of one embodiment of the standardizing server 108. The standardizing server 108 includes a controller 242, a command resolver 244, and a database 246. The controller 242 controls the overall operations of the standardizing server 108 and is therefore responsible for directing command resolver 244 and database 246 to execute their respective functions. The controller 242 also interfaces with client devices to receive standard commands therefrom, and return the appropriate native commands.

Database 246 stores information that associates websites 106 and hosted applications 110 with their native and corresponding standardized commands. More particularly, for a given website, the database 246 stores a website identifier such as a domain name and/or IP address; identifiers for one or more hosted applications at the website (e.g., URL for each application); and for each application, stores one or more native commands, and corresponding standardized commands.

In one embodiment, the identification of one or more websites, applications, and commands is provided using one or more regular expressions that can be then resolved by the standardizing server 108.

Optionally, the database 246 also stores identifiers for add-on functions supported by the website 106, a description for each add-on functions, a download location for the add-on functions, identifiers for any plugins required to support the add-on functions, description for the plugins, and a download location for the plugins. The use of these additional identifiers for add-on functionality is further described below. The database 246 can be implemented using any type of database architecture, including a relational database, such as MySQL, PostgreSQL, or the like.

The command resolver 244 is responsible for receiving from the controller 242 the information identifying the website 106, application 110, and standardized command, and accessing the database 246 to obtain the corresponding native command. The command resolver 244 returns the native command to the controller 242, which provides the native command back to the requesting client device 102.

Figure 3:
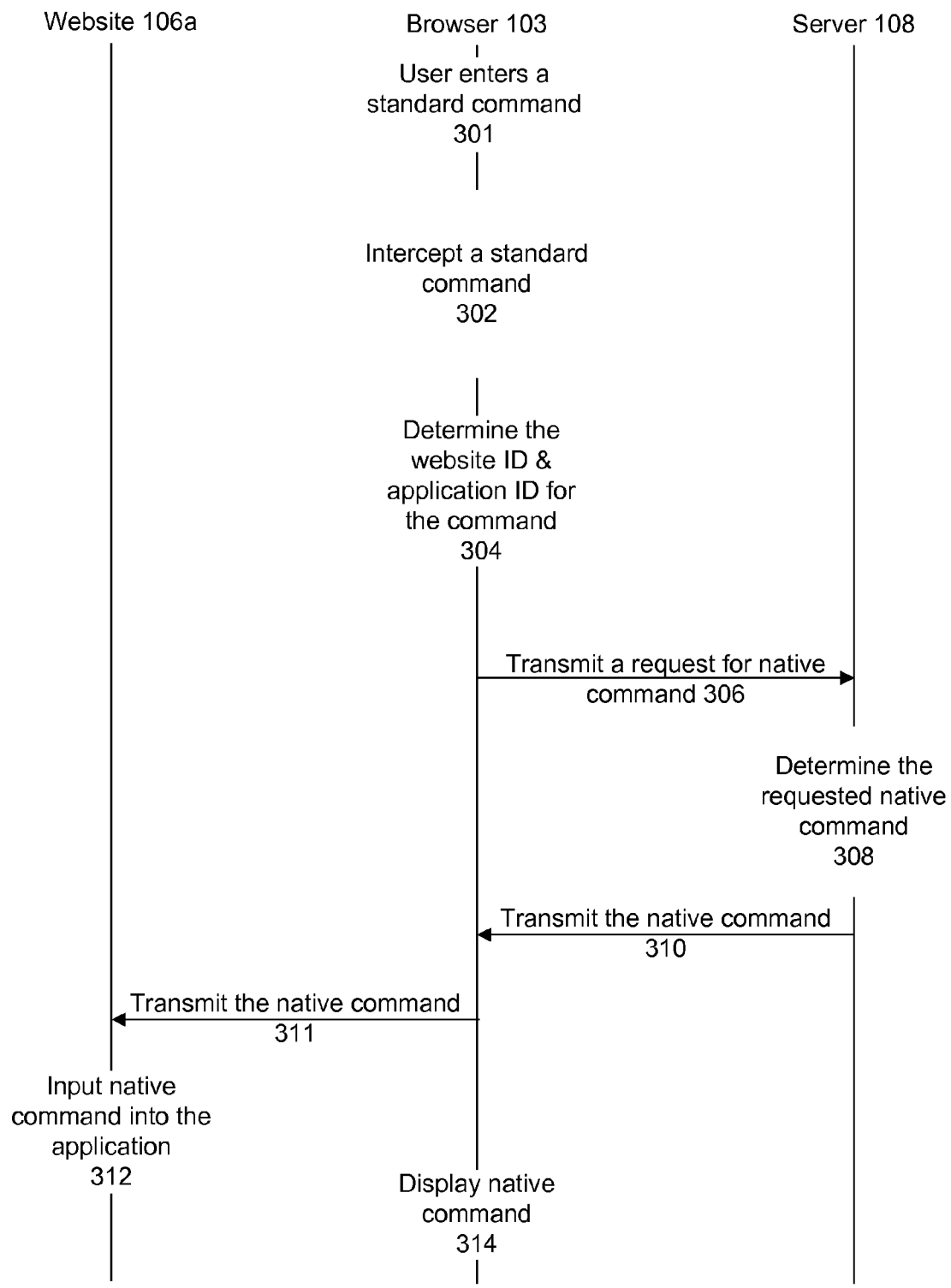
FIG. 3 is a flowchart illustrating a method for providing a web-based application with native commands when the application user provides a standard command to the web-based application.

FIG. 3 illustrates a method for providing a web-based application with native commands when the application user provides a standard command to the web-based application for an application behavior. A user accesses a web-based application on website 106a through browser 103 on client device 102. The user enters 301 a standard command for an application behavior of the web-based application and browser 103 on client device intercepts 302 the standard command. The browser 103 determines 304 the website identifier and an identifier for the DOM element that currently has focus (i.e. the web-based application). The browser 103 transmits 306 a request to standardizing server 108 for native command corresponding to the user input standard command. The request includes website identifier, identifier for the DOM element, and the user input command.

These parameters enable the standardizing server 108 to search database 246 for the corresponding native command. Controller 242 in standardizing server 108 receives the request and directs command resolver 244 to query database 246 to determine 308 the native command corresponding to the received user input command associated with the web-based application. As discussed earlier, the database 246 can include native commands for applications on a particular website represented by website identifier or a set of websites represented by a regular expression. Database 246 returns native commands from either of these records when received website identifier corresponds to a stored website identifier or a stored regular expression identifier. In one embodiment, the command resolver 244 also determines additional native commands for the web-based application.

In one embodiment, the command resolver 244 determines that no native command corresponds to the user input standard command and controller 242 transmits 310 to the browser 103 the additional native commands and corresponding standard commands without a native command corresponding to the user input standard command. The browser 103 then displays 314 the additional native commands and corresponding standard commands to the user and the user can choose a new input command from the displayed set of commands.

If command resolver 244 does find a corresponding native command in database 246, the controller 242 transmits 310 to the client the native command corresponding to the received user input command, and optionally the additional native commands and corresponding standard commands. In one embodiment, the controller 242 also transmits the identifier for the web-based application and the website identifier with the native command. These parameters enable the browser 103 to determine the web-based application that should get the received native command. Browser 103 determines the appropriate website and transmits 311 the native command to website 106a.

The website 106a then inputs 312 the native command in the web-based application 110. In one embodiment, inputting native commands comprises calling a script wherein the script is a sequence of instructions. For example, inputting a native command can call a post processing script that changes the color scheme of the displayed image in video application 110a. In another embodiment, inputting native command comprises setting an event wherein setting the event initiates an event handler routine in the application. For example, inputting a native command can set a PAUSE event and initiate a PauseImage event handler routine in the video application 110a that pauses the displayed image in video application 110a.

In one embodiment, the browser 103 does not automatically transmit the native command to website 106a. The browser 103 instead displays 314 the native command and gives the user the option to use the native command or another command for the web-based application 110. The browser 103 may also display corresponding standard command with the native command. Additionally, the browser 103 may display additional native commands and corresponding standard commands on the client device 102. The user can now see the additional native commands supported by the web-based application and the corresponding standard commands.

In one embodiment, the standardizing server 108 receives the request for native command from browser 103, where the request includes the website identifier for website 106a. The standardizing server 108 determines 308 a list of standard commands and corresponding native commands for applications 110 on website 106a. The standardizing server transmits 310 the list of commands to browser 103 and browser 103 displays 314 the list of standard commands and native commands to the user and lets the user select the appropriate native command. In one embodiment, browser 103 selects a native command from the received list and transmits 311 the selected native command to website 106a.

In one embodiment, the browser 103 also stores the website identifier, and the received list in a local data file for future use. The next time a user inputs a standard command for the web application 110a, browser 103 first searches its local data file for a native command before querying the standardizing server 108 for the native command. If the browser 103 does not have the native command, browser 103 queries the standardizing server 108 and updates its database with additional sets of standard commands and native commands received from standardizing server in response to the query.

In one embodiment, the actual website identifier is not used to identify the website for which the browser 103 is requesting a native command. Here, the browser 103 applies a weak hash function and a strong hash function on the website identifier, and determines a weak hash reference and a strong hash reference for the website identifier. The browser 103 then transmits the weak hash reference to the standardizing server 108.

The database 246 also uses the weak and strong hashes, as applied to the application identifiers. A hash table is maintained for the weak hashes of the application identifiers, such that multiple different application identifiers will hash to the same weak hash. The strong hashes identify individual applications. In the hash table, for each given weak hash there is stored the plurality of strong hashes for the multiple application identifiers that correspond to the given weak hash.

Thus, the controller 242 in standardizing server 108 receives the weak hash from the browser 103, and queries database 246 for the plurality of strong hashes that correspond to the received weak hash. These strong hash values are transmitted to the browser 103. The browser 103 compares its previously calculated strong hash (from the application identifier) with the received plurality of strong hashes and selects the strong hash that matches the previously calculated strong hash from the application identifier. The browser 103 now uses this selected strong hash reference as a proxy for the website identifier for further communication with the standardizing server 108. In this manner, the browser 103 and standardizing server 108 exchange information about a website identifier without transmitting the actual website identifier over the network.

In one embodiment, controller 242 in standardizing server 108 receives a weak hash from browser 103, queries database 246 and determines all the strong hashes corresponding to the weak hash. The controller 242 then determines the websites identifiers associated with the strong hashes, application identifiers associated with each of those website identifiers and list of native commands and standardizing commands associated with those application identifiers. The standardizing server 108 then transmits to browser 103 all of the above determined information. Next, the browser 103 selects from the received information the native command corresponding to the user input standard command for the particular website and application it is currently using. In one embodiment, browser 103 also stores the received information in a local data file. The browser 103 can later search the local data file for a native command before requesting the command from standardizing server 108.

Figure 4:
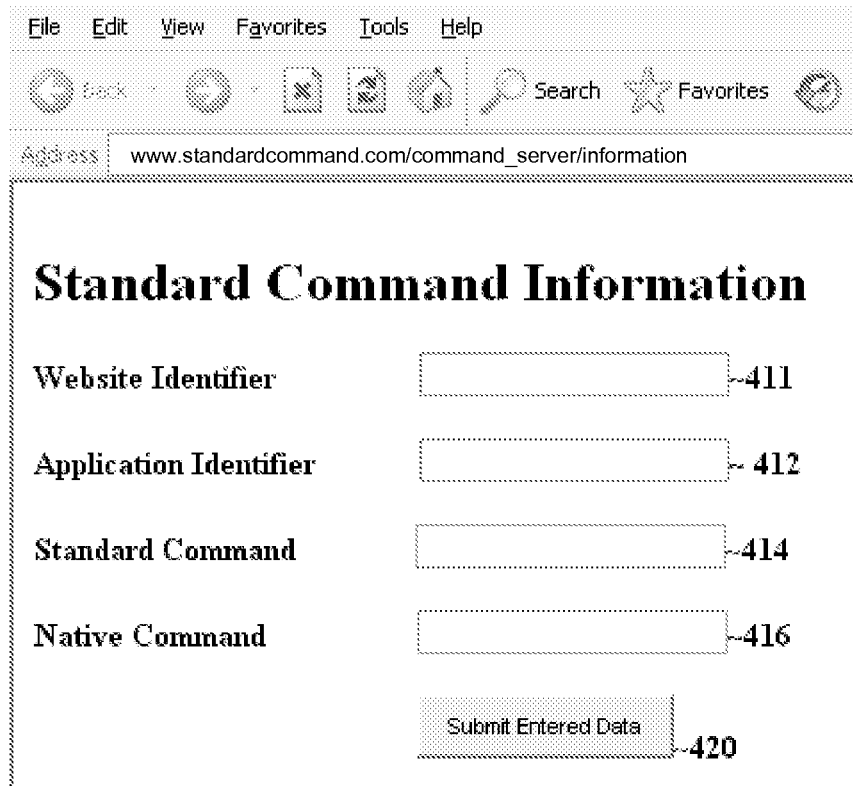
FIG. 4 is an illustration of a user interface for populating a database comprising information about standard commands and corresponding native commands.

FIG. 4 illustrates a user interface for populating database 246 in standardizing server 108. Database 246 can be populated by a server administrator responsible for collecting information about various web-based applications, standardized commands for those applications, and native commands corresponding to the standard commands. In one embodiment, the website administrators of websites 106 hosting web based applications 110 store at a predetermined location a file with website identifier, application identifier, and the list of native commands and corresponding standard commands for the application. The server administrator then uses a web crawler to analyze the stored file for various websites and collect information about the native commands used on web-based applications on these other websites.

Alternatively, database 246 can be populated collectively by various users in the user community and the collected information can be edited by an administrator. Various users can therefore provide native commands used for various web-based applications and the administrator can verify the native commands before adding the user input native commands into database 246. For example, the administrator can verify that the native command entered by one user is accurate after receiving the same native command by another user. Alternatively, the administrator can verify that the native command entered by one user is accurate after using the native command for the web-based application.

In one embodiment, individual members of a user community, instead of an administrator, edit the collected information. In this embodiment, native commands for various applications are provided by various users for database 246 and published on a website. Subsequent readers can then edit or append the list of native commands for various applications. The users can enter information for database 246 through a user interface like the one illustrated in FIG. 4.

The user interface in FIG. 4 comprises of prompts requesting a user for certain input and corresponding input box where the user can provide the input. The user interface comprises a website identifier prompt and corresponding website identifier input box 411, an application identifier prompt and corresponding application identifier input box 412, a standard command prompt and corresponding standard command input box 414, a native command prompt and native command input box 416. The user interface also comprises a submit button 420 that allows the user to submit the entered data.

Figure 5:
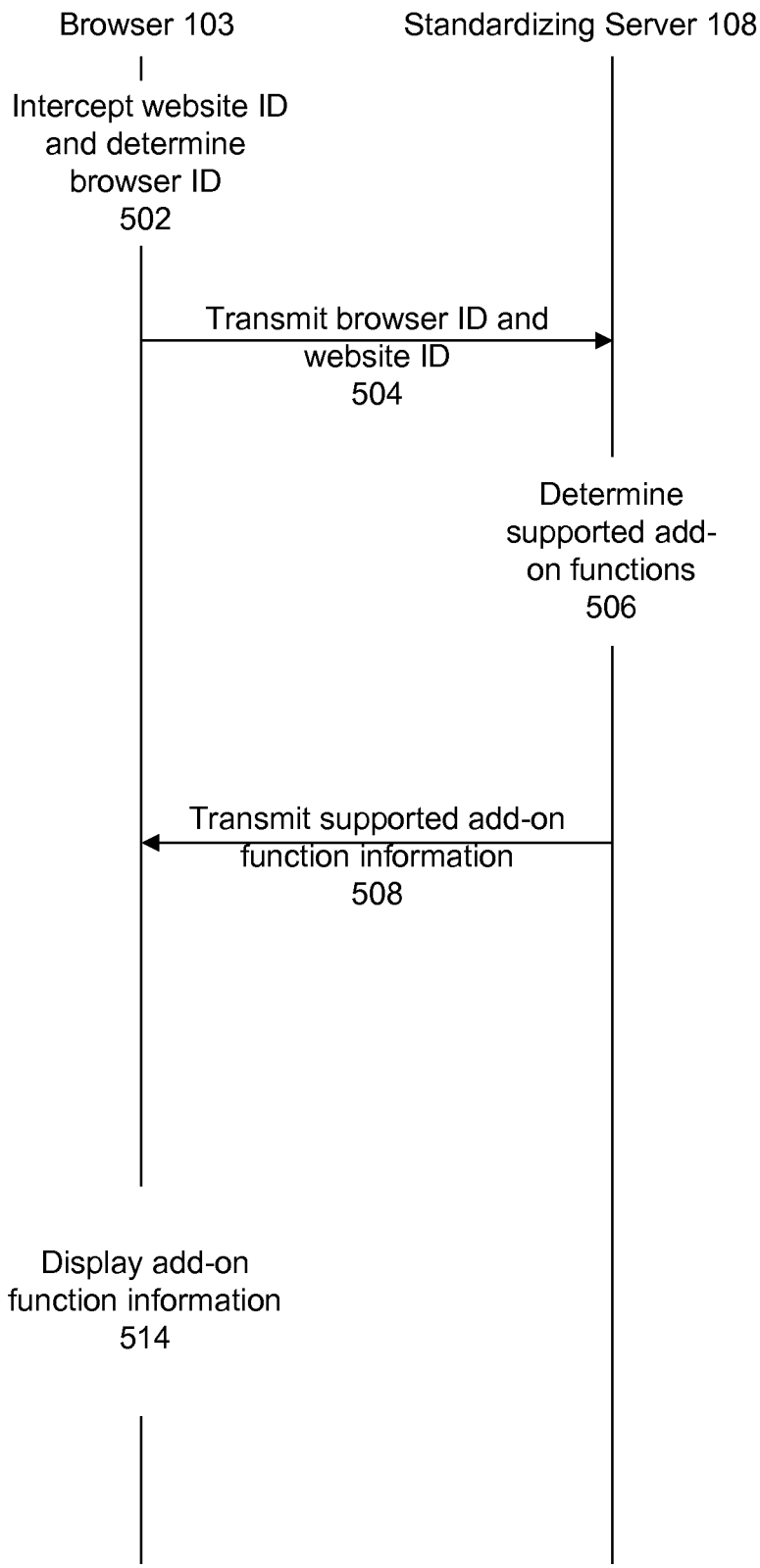
FIG. 5 is a flowchart illustrating a method for providing the user with information about add-on functions and corresponding plugins supported by a website.

FIG. 5 illustrates a method for providing the user with a list of add-on functions and corresponding plugins supported by a website. The browser 103 on client computing device 102 intercepts 502 or receives a website identifier from the user.

The browser 103 transmits 504 the website identifier and/or a browser identifier to standardizing server 108 requesting transmission of information about add-on functions and corresponding plugins supported by the website. The identity of the browser 103 is used by the standardizing server 108 to determine the particular add-on functionality supported by the browser 103. In response to receiving the request, controller 242 in standardizing server 108 queries database 246 and determines 506 supported add-on functions and any corresponding plugins for the identified website and browser. The standardizing server 108 transmits 508 to browser 103 the identifiers for add-on functions supported by the website, a corresponding description and the download location for the add-on functions. In one embodiment, the standardizing server 108 also transmits identifiers for any plugins required for add-on functions, corresponding descriptions and download location for the plugins.

The browser 103 receives the list of supported add-on function identifiers, corresponding download locations and descriptions, corresponding plugin identifiers, description for the plugins and location to download the plugins. The add-on function identifiers and plugin identifiers can be any reference to identify the add-on function and the plugin. For example, the add-on function identifier or the plugin identifier can be an alphanumeric identification string. The download location can be a URL or a network layer address.

The browser displays 514 the received items to the user. The user can now download the scripts and plugins from the displayed location.

Figure 6:
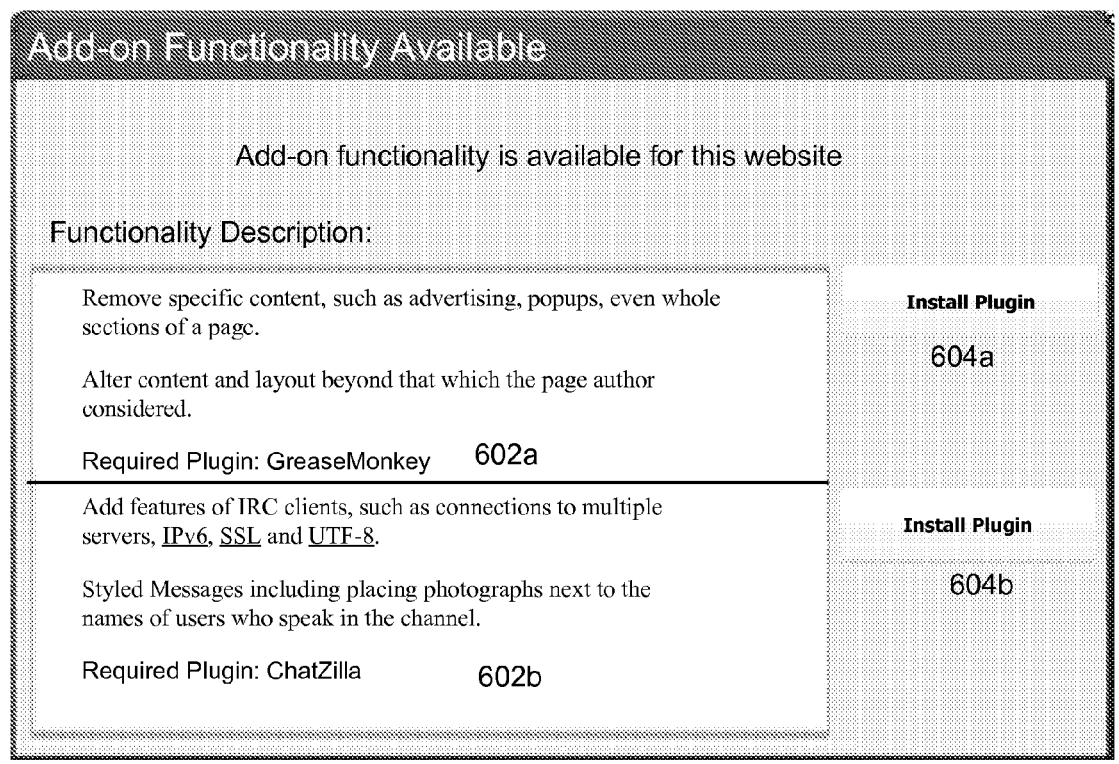
FIG. 6. is an illustration of a user interface for displaying the supported add-on functions and corresponding plugins supported by a website.

FIG. 6 illustrates an example of a user interface for displaying the supported add-on functionality and corresponding plugins for a website. The user interface informs the user of available add-on functionality and the corresponding plugins required for the add-on functionality. The interface comprises functionality description blocks 602 and install buttons 604. For example, functionality description block 602*a* describes the scripts available for blocking certain content from the web page and altering the layout of the webpage. The functionality description block 602*a* also informs the user that the GreaseMonkey plugin is required for these scripts. The user can download and install the plugin by clicking the install plugin button 604*a*. Functionality block 602*b* describes functionality for another script that adds additional chat message capabilities like displaying the photographs of chatters as they chat with each other. Functionality block 602*b* also informs the user that the ChatZilla plugin is required for these scripts and the user can download and install Chatzilla by clicking install plugin button 604*b*.

FIG. 7 illustrates a user interface for populating database 246 in standardizing server 108 with information regarding add-on functionality supported by a website and required plugins corresponding to add-on functionality. Database 246 may be populated with this information in any of the manners described above with reference to FIG. 4. The user interface in FIG. 7 comprises prompts requesting a user for certain input and corresponding input box where the user can provide the input. The user interface comprises a website identifier prompt and website identifier input box 711, an application identifier prompt and a corresponding application identifier input box 712, an add-on function identifier prompt and add-on function input box 713, an add-on function description prompt and add-on function description input box 714, an add-on function download location prompt and an add-on function download location input box 715, a plugin identifier prompt and a plugin identifier input box 716, a plugin description prompt and a plugin description input box 717, a plugin download location prompt and a plugin download location input box 718. The user interface also comprises a submit button 720 that allows the user to submit the entered data.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs.

Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the actions and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for providing native commands for a web-based application, the method comprising:
    receiving, from a client device, a request for a native command that corresponds to a standardized command, wherein the request for the native command comprises the standardized command and an identifier associated with a website being used by the client device to access the web-based application;
    identifying the native command that corresponds to the standardized command based at least in part on the standardized command and the identifier of the web-based application; and
    transmitting, to the client device, the identified native command that corresponds to the standardized command as a response to the request for the native command.

2. The method of claim 1, wherein the request further comprises an identifier associated with the web-based application being used by the client device to access the web-based application.

3. The method of claim 1, wherein identifying the native command further comprises:
    querying a database of native commands to determine the corresponding standardized command.

4. The method of claim 1, wherein determining the native command further comprises:
    determining a stored regular expression identifier for a set of websites corresponding to the received website identifier; and
    determining the native command for the web-based application corresponding to the regular expression identifier and the standardized command.

5. The method of claim 1, wherein the standardized command comprises information representing a combination of two or more keystrokes input by the user.

6. The method of claim 1, further comprising:
    receiving a second request from the client device for a second native command that corresponds to a second standardized command, wherein the request for a native command comprises the second standardized command and the identifier associated with the website being used by the client device to access the web-based application;
    determining that no native command corresponds to the second standardized command;
    determining a list of native commands and corresponding standardized commands for one or more applications on the website; and
    in response to determining that no native command corresponds to the second standardized command, transmitting the list of native commands and corresponding standardized commands to the client device for presentation to the user.

7. The method of claim 1, further comprising:
    determining a list of native commands and corresponding standardized commands, including the native command and the standardized command, for one or more applications on the website, including the web-based application; and
    transmitting the list of native commands and corresponding standardized commands to the client device to be cached.

8. A system for providing native commands for a web-based application, the system comprising:
    a processor that is programmed to:
        receive, from a client device, a request for a native command that corresponds to a standardized command, wherein the request for the native command comprises the standardized command and an identifier associated with a website being used by the client device to access the web-based application;

identify the native command that corresponds to the standardized command based at least in part on the standardized command and the identifier of the web-based application; and transmit, to the client device, the identified native command that corresponds to the standardized command as a response to the request for the native command.

9. The system of claim 8, wherein the request further comprises an identifier associated with the web-based application being used by the client device to access the web-based application.

10. The system of claim 8, wherein the processor is further configured to:

query a database of native commands to determine the corresponding standardized command.

11. The system of claim 8, wherein the processor is further configured to:

determine a stored regular expression identifier for a set of websites corresponding to the received website identifier; and determine the native command for the web-based application corresponding to the regular expression identifier and the standardized command.

12. The system of claim 8, wherein the standardized command comprises information representing a combination of two or more keystrokes input by the user.

13. The system of claim 8, wherein the processor is further configured to:

receive a second request from the client device for a second native command that corresponds to a second standardized command, wherein the request for a native command comprises the second standardized command and the identifier associated with the website being used by the client device to access the web-based application;

determine that no native command corresponds to the second standardized command;

determine a list of native commands and corresponding standardized commands for one or more applications on the website; and in response to determining that no native command corresponds to the second standardized command, transmit the list of native commands and corresponding standardized commands to the client device for presentation to the user.

14. The system of claim 8, wherein the processor is further configured to:

determine a list of native commands and corresponding standardized commands, including the native command and the standardized command, for one or more applications on the website, including the web-based application; and transmit the list of native commands and corresponding standardized commands to the client device to be cached.

15. A non-transitory computer-readable medium containing computer executable instructions that, when executed by a processor, cause the processor to perform a method for providing native commands for a web-based application, the method comprising:

receiving, from a client device, a request for a native command that corresponds to a standardized command, wherein the request for the native command comprises the standardized command and an identifier associated with a website being used by the client device to access the web-based application;

identifying the native command that corresponds to the standardized command based at least in part on the standardized command and the identifier of the web-based application; and transmitting, to the client device, the identified native command that corresponds to the standardized command as a response to the request for the native command.

16. The non-transitory computer-readable medium of claim 15, wherein the request further comprises an identifier associated with the web-based application being used by the client device to access the web-based application.

17. The non-transitory computer-readable medium of claim 15, wherein identifying the native command further comprises:

querying a database of native commands to determine the corresponding standardized command.

18. The non-transitory computer-readable medium of claim 15, wherein determining the native command further comprises:

determining a stored regular expression identifier for a set of websites corresponding to the received website identifier; and determining the native command for the web-based application corresponding to the regular expression identifier and the standardized command.

19. The non-transitory computer-readable medium of claim 15, wherein the standardized command comprises information representing a combination of two or more keystrokes input by the user.

20. The non-transitory computer-readable medium of claim 15, wherein the method further comprises:

receiving a second request from the client device for a second native command that corresponds to a second standardized command, wherein the request for a native command comprises the second standardized command and the identifier associated with the website being used by the client device to access the web-based application;

determining that no native command corresponds to the second standardized command;

determining a list of native commands and corresponding standardized commands for one or more applications on the website; and in response to determining that no native command corresponds to the second standardized command, transmitting the list of native commands and corresponding standardized commands to the client device for presentation to the user.

21. The non-transitory computer-readable medium of claim 15, wherein the method further comprises:

determining a list of native commands and corresponding standardized commands, including the native command and the standardized command, for one or more applications on the website, including the web-based application; and transmitting the list of native commands and corresponding standardized commands to the client device to be cached.

* * * * *